(12) United States Patent
Saada et al.

(10) Patent No.: US 9,809,139 B2
(45) Date of Patent: Nov. 7, 2017

(54) VEHICLE SEAT EQUIPPED WITH A FOLD-DOWN ELEMENT, SUCH AS A TRAY

(71) Applicant: Expliseat, Paris (FR)

(72) Inventors: Benjamin Jacob Saada, Paris (FR); Jean-Charles Marcel Samuelian, Paris (FR); Vincent Tejedor, Merignac (FR)

(73) Assignee: EXPLISEAT, Paris (FR)

( * ) Notice: Subject to any disclaimer, the term of this patent is extended or adjusted under 35 U.S.C. 154(b) by 0 days.

(21) Appl. No.: 14/779,742

(22) PCT Filed: Mar. 25, 2014

(86) PCT No.: PCT/EP2014/055920
§ 371 (c)(1),
(2) Date: Sep. 24, 2015

(87) PCT Pub. No.: WO2014/154666
PCT Pub. Date: Oct. 2, 2014

(65) Prior Publication Data
US 2016/0046224 A1    Feb. 18, 2016

(30) Foreign Application Priority Data
Mar. 26, 2013  (FR) ..................................... 13 52709

(51) Int. Cl.
*B60N 3/00*    (2006.01)
*B64D 11/06*   (2006.01)
(Continued)

(52) U.S. Cl.
CPC ........... *B60N 3/004* (2013.01); *B60N 2/4221* (2013.01); *B60N 2/4228* (2013.01);
(Continued)

(58) Field of Classification Search
CPC ................ B60N 2/4221; B60N 2/4228; B60N 2/42709; B60N 3/004; B60N 2/42781; B64D 11/0638; B64D 11/0619
(Continued)

(56) References Cited

U.S. PATENT DOCUMENTS 4,335,918 A * 6/1982 Cunningham ..... B60N 2/42745
280/751
2014/0015290 A1   1/2014 Saada
(Continued)

FOREIGN PATENT DOCUMENTS

| FR | 2 781 440 A1 | 1/2000 |
| FR | 2 883 529 A1 | 9/2006 |

(Continued)

OTHER PUBLICATIONS

Search Report issued in French Patent Application No. FR 13 52709 dated Nov. 25, 2013.
(Continued)

*Primary Examiner* — Milton Nelson, Jr.
(74) *Attorney, Agent, or Firm* — Pearne & Gordon LLP (57) ABSTRACT

The transport vehicle seat allows to avoid the violent collision of a passenger's head located on the seat placed behind and to dampen the violent forward rocking of this passenger, in case of a frontal collision of the transport vehicle. The seat includes a pivotably mounted fold-down element (10), such as a table, placed on the rear face of a seat back. It has blocking part (14) holding the fold-down element (10) in a substantially vertical position, blocking part (14) being able to break off during a collision applied to the fold-down element (10) and to allow the latter to go on rocking towards the back seat to which it is attached. Application to aircraft seats.

8 Claims, 7 Drawing Sheets

(51) Int. Cl.
  *B60N 2/42* (2006.01)
  *B60N 2/427* (2006.01)

(52) U.S. Cl.
  CPC ..... *B60N 2/42709* (2013.01); *B60N 2/42781* (2013.01); *B64D 11/0619* (2014.12); *B64D 11/0638* (2014.12); *Y02T 50/46* (2013.01)

(58) Field of Classification Search
  USPC .................................. 297/216.14, 163, 173
  See application file for complete search history.

(56) References Cited

U.S. PATENT DOCUMENTS

| | | | |
|---|---|---|---|
| 2014/0252822 A1 | 9/2014 | Tejedor | |
| 2015/0036794 A1 | 2/2015 | Hsieh | |
| 2015/0336672 A1* | 11/2015 | Hommel | B64D 11/0015 297/163 |
| 2016/0046379 A1 | 2/2016 | Saada | |

FOREIGN PATENT DOCUMENTS

| WO | 2010/086785 A1 | 8/2010 |
|---|---|---|
| WO | 2011/094668 A2 | 8/2011 |
| WO | 2012/104248 A2 | 8/2012 |
| WO | 2012/130809 A1 | 10/2012 |
| WO | 2013/003537 A1 | 1/2013 |
| WO | 2013/006749 A1 | 1/2013 |

OTHER PUBLICATIONS

International Preliminary Report on Patentability issued in Application No. PCT/EP2014/055920 dated Jul. 17, 2015.
International Search Report issued in Application No. PCT/EP2014/055920 filed Jun. 25, 2014.
Written Opinion issued in Application No. PCT/EP2014/055920 filed Jun. 25, 2014.

* cited by examiner

VEHICLE SEAT EQUIPPED WITH A FOLD-DOWN ELEMENT, SUCH AS A TRAY

TECHNICAL FIELD OF THE INVENTION

The present invention relates to the field of passenger transport, in particular public transports, in particular road, rail or air transports.

It relates more particularly to making a vehicle seat including a fold-down element, attached to the seat back, consisting in particular of a table, that can pivot to the front of the seat, in particular through the seat back. This arrangement is provided to lessen the effects of a frontal collision of the vehicle on the body, and in particular the head, of a passenger located on a seat placed behind the seat in question, provided with the fold-down element.

Prior Art and Problem to be Solved

The volume and weight of vehicle seats are concerns which are addressed so as to decrease the transport environmental footprint, in particular public means of transports. The decrease in the volume and weight does not have however to have an impact on the passenger's security.

In the air transport in particular, the reduction in volume and weight is exacerbated by the energy necessary for a given flight. Since security is an essential element, lightening strategies should be made without compromising the seat resistance. By reducing the unit volume of the seats, it is possible to decrease the spacing between two seats rows and to increase the number of passengers that can seat down within the aircrafts or, reversely, to increase the space assigned to each passenger. A better filling of the aircraft enables, at a constant passenger flow on an airline, the number of flights to be decreased. Likewise, since the reduction in the unit weight of the seats restricts the energy necessary for a given flight, the fuel necessary for these flights is thereby saved, which reduces the greenhouse gas emissions accordingly.

Patent WO/2010/086785 shows the state of the art of pivotable elements attached to a seat: these elements have one or more positions when used by the passenger, and a folded fixed position upon putting away the element. The element in question can be, without limitation, an arm rest, a cup holder, a table, a screen or an electronic apparatus, a coat hanger.

Patent WO/2011/094668 describes more precisely a way of defining the folded position of an element, herein a table, when not used. A recess is provided in the seat, and the table comes to be inserted within this recess. A coating can be added to the exposed part of the table to dampen a passenger in case of a collision.

Patent WO/2013/003537 suggests to position an element, again a table, onto a pivoting arm, for the purpose of being able to orient the position of the element when used by the passenger. Again, the position when the element is not used is simply a substantially vertical fixed position.

Patent WO/2013/006749 discloses in turn an active device for folding the table when the seat is in a straight position: the table can be unfolded, at different slants depending on the seat slant, and it is automatically folded down when the seat is in the straight position.

All these arrangements for attaching and positioning seat elements, as the table, are based on the principle that the element is in a fixed unchangeable position when not used, that is in a "put away state". These elements can be hazardous in case of an accident, because they are on the path travelled by the passenger's head for the case of the elements attached to the rear of the seat back.

Figure 1:
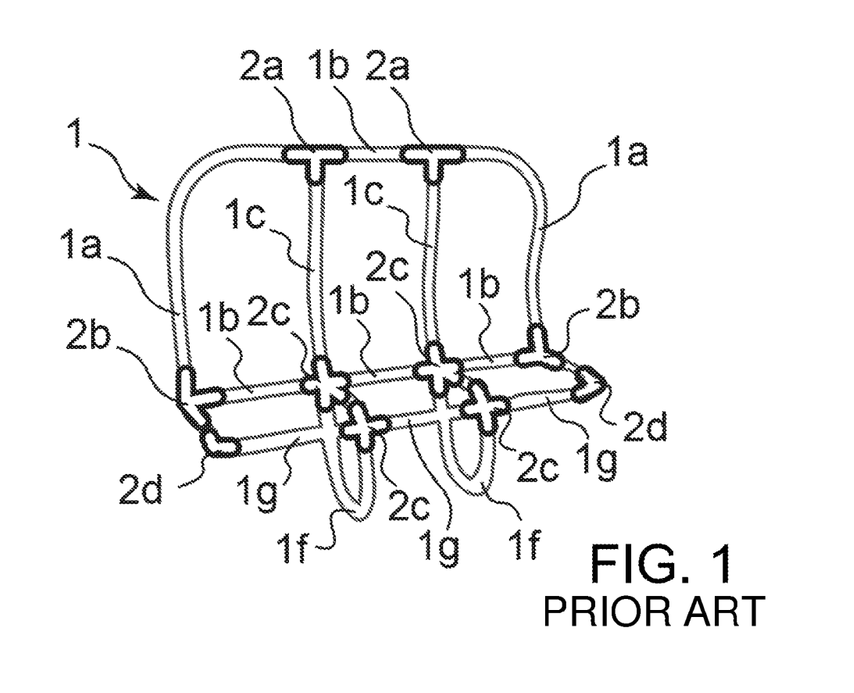
FIG. 1 shows, in a perspective view, a framework of a set of three seats according to prior art and according to the invention.

On the other hand, international application WO 2012/104 248 discloses an ultra-light aircraft seat, having relatively small overall space and weight, while allowing passenger comfort, in particular at the seating and seat back. With reference to FIG. 1, an exemplary structure 1 for forming a set of three seats is represented. The structure 1 consists of several tubular elements 1a, 1b, 1c, 1d, 1f, and 1g, assembled to each other by different junction parts 2a, 2b, 2c, 2d. It is thus noted that empty spaces are provided at the seatings and backs of the three seats, for fabrics to extend between the tubular elements and make up the functional elements of the seats.

On the other hand, the passenger security should be ensured in case of a violent, in particular frontal, collision of the aircraft, for example in case of a crash. In the case of the structure 1, described in FIG. 1, the seat back does not fold during collision, since the structure 1 is not deformable. On the other hand, as described in international application WO 2012/130809, the use of an energy absorbing fabric tensioned between the tubular elements 1a-1g of the structure 1 enables the collision energy to be absorbed by gradually slowing down the passenger.

Figure 2:
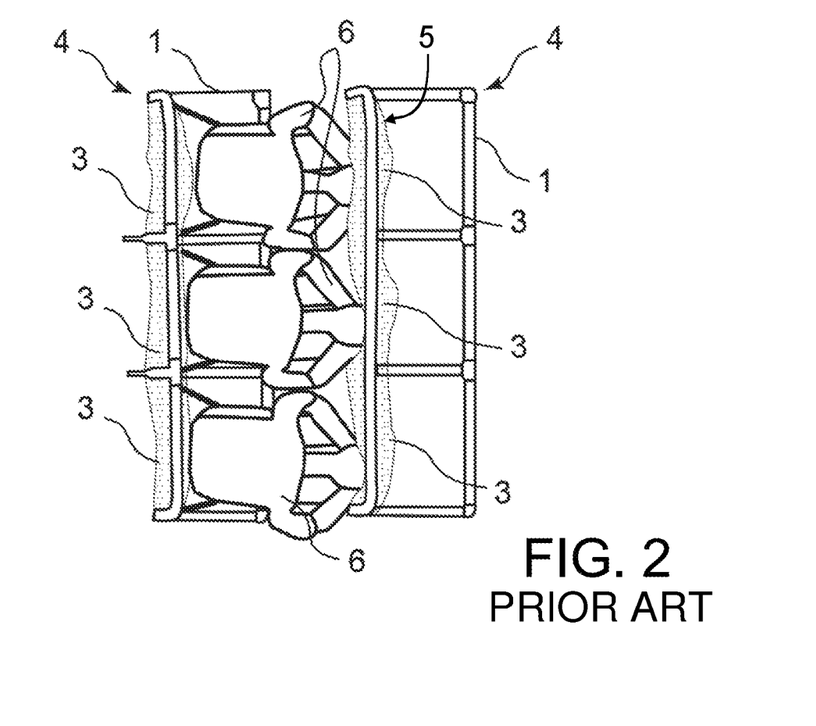
FIG. 2 is a perspective view of seats according to prior art, in the presence of a passenger and in a collision situation.

FIG. 2 shows an exemplary embodiment of a set of two rows 4 of three seats according to prior art. During a frontal collision, each passenger 6 is hurled to the front, against the rear of the seat back 3 of the seat placed in front of him/her. The seat backs 3, made of energy absorbing fabrics, tensioned in the middle of the structure 1, are thus deformed and absorb the collision energy, by gradually slowing down the passenger 6, in particular his/her head. In this case, the presence of a fold-down rigid element, such as a table, on the back 3 of the front seat can make up a hazard for the passenger 6, during such a collision. Indeed, the passenger 6 does not strike the deformable fabric making up the seat back 3, but a rigid table integrally linked to the rigid structure 1 which obstructs its advance. The collision felt by the passenger 6 can then be higher than the regulatory requirements. The HIC (Head Injury Criterion), the formula of which is given herein below, can in particular exceed the threshold of 1000:

$$HIC = \left( (t_2 - t_1) \left( \frac{1}{t_2 - t_1} \int_{t_1}^{t_2} a(t)\, dt \right)^{5/2} \right)_{max}$$

In this formula, $a(t)$ is the acceleration in $m \cdot s^{-2}$ of the centre of gravity of the head, $t_1$ and $t_2$ two instants, measured in s, of the kinematics, with $t_2 - t_1 > 15$ ms.

Moreover, if the rear of the seat 5 is desired to be functionalized, in order to insert accessories therein accessible to the passenger 6 located on the seat 5 behind, one should make sure that these accessories do not make a rigid obstacle during a crash.

Finally, the patent document FR 2 883 529 A1 describes a vehicle seat, equipped with an adjustable adaptable table pivoting about a horizontal axis, facing the passenger located on the seat located behind the seat concerned. The device described in this document enables said table to be positioned in several positions, by actuation of the person located behind the table. A system of holes 42, arranged on an indexer cylinder, enables balls to be accommodated therein, under the action of a spring. The holes 42 are arranged, inter alia, at different angular positions, defining different functional positions of the table. The strain is thus the same to pivot the table, regardless of its position, in particular the last hole defining a vertical position.

The purpose of the invention is thus to overcome these drawbacks and to allow the advance of the passenger's body, in particular his/her head, located on the seat behind the seat considered, through the back of the considered seat located at the front of him/her, even in the presence of a fold-down element on the seat back, during an aircraft frontal crash and also to slow down this advance. The state of the art of the element attachments on aircraft seats does not enable the passenger security to be ensured without substantially increasing the seat weight, for example, by adding foam on the lower surface of the table.

DISCLOSURE OF THE INVENTION

To that end, the main object of the invention is a vehicle seat for a passenger, including a seat back having a front face pointed to the passenger and a rear face opposite to the front face, the seat including an element which folds down to the rear face of the seat back, pivotably mounted with respect to the seat back, by means of at least one hinge about un axis of rotation enabling the fold-down element to take on at least two predetermined angular positions, defined by at least two abutment means, including a substantially vertical position, in which the fold-down element is folded down to the rear face of the seat back.

In the main application of the invention, the fold-down element is a table.

According to the invention, the abutment means, relating to the substantially vertical position is configured to enable the fold-down element to continue its pivoting beyond the substantially vertical position, to the front face of the seat back,
under the effect of a collision against the fold-down element, for example the collision of a passenger's head located behind said seat, for example on a seat located behind said seat, beyond a force and a predetermined value.

By "vehicle", it is meant any means of transport or displacement of at least one passenger, for example a plane, a car, a train, a boat, a thrill ride basket, among others.

The front face of the seat back is the face of the seat back coming in contact with the back of the passenger seated on the seat, and the rear face of the seat back is the face of the seat back which faces the passenger located on the seat behind the seat considered.

The seat according to the invention can further include one or several of the following characteristics taken independently or according to any technical combinations possible.

The abutment means, relating to the substantially vertical position, can include increasing resistance means, able to hold the fold-down element in the substantially vertical position in the absence of said collision, and able to enable the fold-down element pivoting to be continued to the front face of the seat back during said collision, with an increasing resistance to pivoting.

The increasing resistance means can include at least one elastic spring.

The increasing resistance means can include a series of blocking parts, each able to mechanically break off under the effect of a predetermined force, which is increasing in the breaking direction.

The fold-down element can be mounted between two structure elements of the seat, pivotably about an axis of rotation of said at least one hinge, which includes, for each structure element, a rotary part projecting from each structure element, and in that the increasing resistance means include first and second elastic elements each attached by a first end to the rotary parts, and by a second end to attachment parts for attaching the fold-down element at said at least one hinge, the first and second elastic elements being located on either side of the structure elements.

The increasing resistance means can include at least one element chosen from a jack system, a friction brake system, a system of pulleys, among others.

The predetermined value of the collision force is higher than or equal to 300 Newtons (about 30 kilogrammes), this force being the one that can result from a passenger pressing against the table under normal conditions.

The abutment means, relating to the substantially vertical position, can include a blocking part able to hold the fold-down element in the substantially vertical position in the absence of said collision, and able to mechanically break off under the application of the force (or moment) of said collision with a predetermined value.

The blocking part can be placed, in the substantially vertical position, against the fold-down element, at one end of the fold-down element which is distant from said at least one hinge.

Alternatively, the blocking part can be placed, in the substantially vertical position, against the fold-down element, at said at least one hinge.

Said at least one hinge can include a bush in which a circular groove forming an arc of a circle is provided, wherein a pin integral with a pivoting end of the fold-down element is slidable, one end of the circular groove making up an abutment means defining a substantially horizontal position of the fold-down element.

LIST OF THE FIGURES

The invention and its different technical characteristics will be better understood upon reading the following detailed description, with several exemplary implementations, in no way limiting thereto, as well as upon examining the schematic and partial figures, in which.

Throughout these figures, identical references can designate identical or analogous elements.

Likewise, different parts in the figures are not necessarily drawn at a uniform scale, for making the figures more legible.

DETAILED DESCRIPTION OF SEVERAL EMBODIMENTS OF THE INVENTION

Generally, tables, pivotably mounted to the rear face of plane seat backs, are blocked in their substantially vertical position, such that these tables can remain lifted during take-off and landing phases or when they are not used. An abutment means, such as a latch pivotably mounted to the structure of the seat back, can define this substantially vertical position.

Figure 3A:
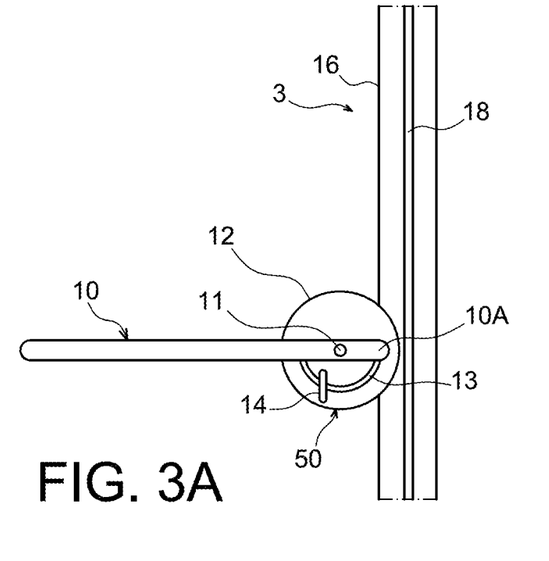
FIGS. 3A and 3B are relating to making abutment means, used in a seat according to the invention.
Figure 3B:
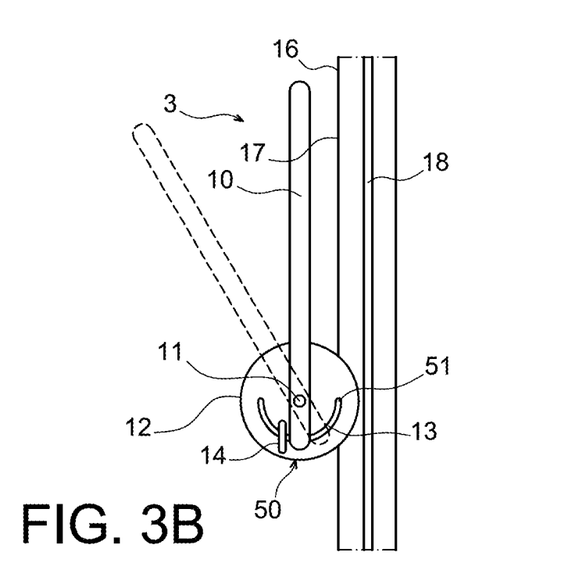

With reference to FIGS. 3A and 3B, a first embodiment of a seat according to the invention provides two hinges 50 placed on either side of the base of a fold-down element, that is a table 10 which is pivoting, on the rear of the seat back 3. Both these hinges 50 each comprise a bush 12, attached to a post 16 of the seat back 3, an axis of rotation 11 about which the fold-down element 10 is pivotably mounted. The end 10A of the table 10 that is located near the axis of rotation 11 follows a circular groove 13, in which a pin, not represented, of the pivoting end 10A of the table 10 slides and in which a blocking part 14, defining the substantially vertical position of the table 10, is attached at a well determined location. The substantially horizontal position of the table 10 is defined by a first end 51 of the circular groove 13. It is noted that this circular groove 13 is extended beyond the blocking part 14, for the purpose of enabling the table to follow its rotational movement.

FIG. 3A shows the substantially horizontal position of the table 10, whereas FIG. 3B shows the substantially vertical position of the table 10, in abutment against the blocking part 14, folded down to the rear face 17 of the seat back 3.

Figure 4A:
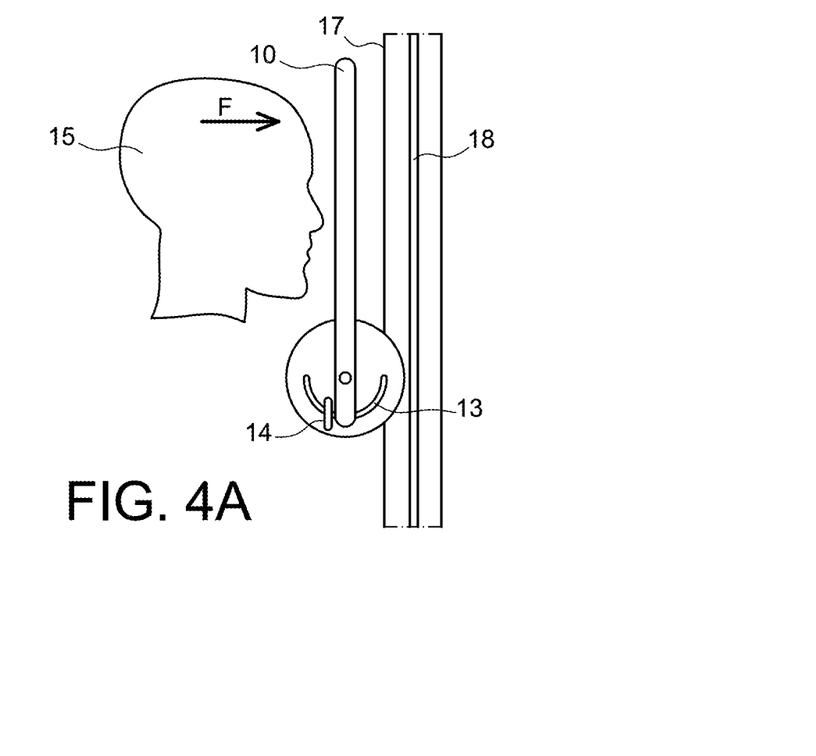
FIGS. 4A and 4B illustrate the operation of the abutment means described in FIGS. 3A and 3B.

With reference to FIG. 4A, in case of a frontal collision of the vehicle, for example an aircraft, the head 15 of the passenger, located on the seat placed behind the seat on which the table 10 is attached, is hurled, with a force F against the table 10.

Figure 4B:
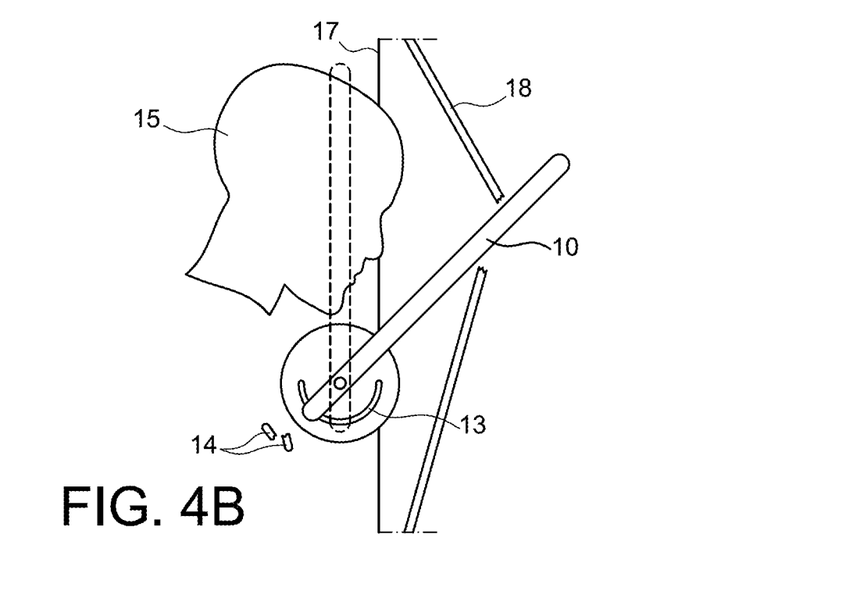

As shown in FIG. 4B, the blocking part 14, under the effect of the collision of the head 15 against the table 10, mechanically breaks off, either by being broken away, or by jumping off the circular groove 13. Consequently, the table 10 is released to go on a possible forward rotation, with respect to the head 15, that has hit the table 10, to pass through the centre part 18 of the seat back 3 through its rear face. The blocking part 14 is removable in that case. It is anticipated that the blocking part 14 is dimensioned to be broken away under the effect of a collision having a force equal to or higher than 300 Newtons (about 30 kilogrammes).

Figure 5:
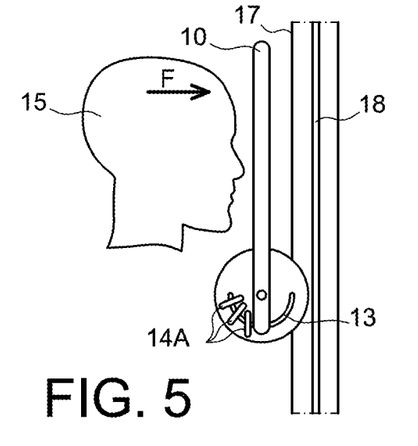
FIG. 5 shows an alternative embodiment of the abutment means used in the seat according to the invention.

With reference to FIG. 5, it is also contemplated to use a series of several blocking parts 14A on the circular groove to make up increasing resistance means. Each of these blocking parts 14A is thus able to mechanically break off under the effect of a determined force, preferably being increasing in the rocking direction of the table.

Figure 6A:
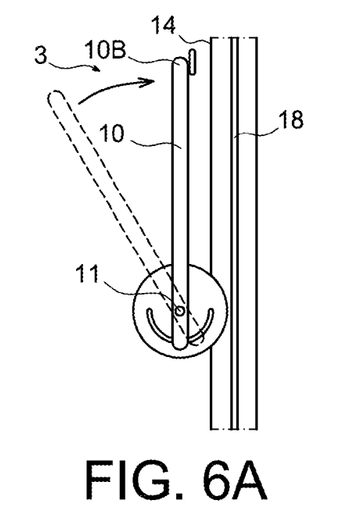
FIGS. 6A and 6B show a second embodiment of the abutment means used in a seat according to the invention.
Figure 6B:
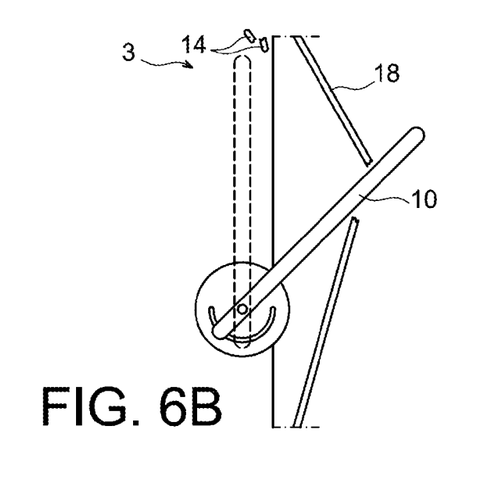

FIGS. 6A and 6B show the use of a blocking part 14, fixedly placed with respect to the seat, against the end 10B of the table 10 most distant from the axis of rotation 11. In this case also, the blocking part 14 is dimensioned to break off beyond the determined force F to enable the table 10 to go on its rotation in a forwardly rocked position, as represented in FIG. 6B. In this case, the blocking part 14 is located at a latch pivotably mounted to the structure 16 of the seat back 3.

Figure 7A:
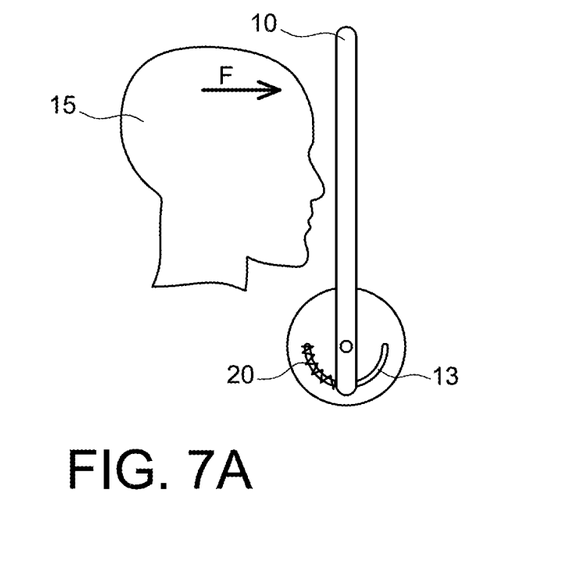
FIGS. 7A and 7B show a third embodiment of the abutment means used in a seat according to the invention.
Figure 7B:
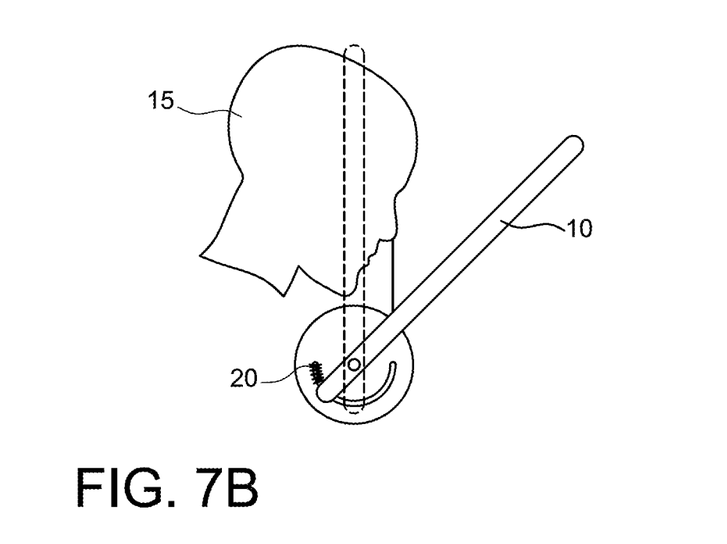

With reference to FIGS. 7A and 7B, the abutment means defining the substantially vertical position can be an elastic means, for example a spring 20 placed at the circular groove 13, in a way analogous to the movable part 14 of FIG. 4A. Thus, the spring 20 holds the table 10 in the substantially vertical position. In this case, during the collision of the head 15 of the passenger located on the seat behind the seat on which the table 10 is attached, the spring 20 is gradually compressed and tends to oppose the further rocking movement of the table 10. The longer the forward displacements of the seat, the greater the spring force of the spring 20. Such an embodiment allows a much more comfortable reception of the passenger's head 15, with respect to the preceding embodiment, because the collision of this head 15 is gradually dampened by the spring 20, which is compressed, as shown in FIG. 6B.

The spring 20 of the embodiment represented in FIGS. 7A and 7B can be replaced with other rotation increasing resistance means, which can be various. Thus, is discussed a jack system, a static or hydraulic friction brake system or even a break system with a static friction within the axis of rotation, such as a system of toothed pulleys to make this resistance. In this case, the hydraulic jack connects the table to the structure and expands or is compressed when the table rotates forwardly, with a fluid friction force proportional to the speed of rotation. The static friction system can either be an analogous system where the jack is replaced with two parts in friction with each other, or be directly at the axis of rotation. The system of nested toothed pulleys consists in combining two or more toothed pulleys within the axis of rotation, some of which are integrally linked to the table, other being integrally linked to the seat structure. During the rotation of the table, the teeth of several pulleys strike each other and are deformed step by step, each deformation restricting the forward advance of the table.

With this kind of embodiment, instead of being violently broken off when the force exerted by the head 15 onto the table 10 exceeds some threshold, the table 10 accompanies the movement of the head 15 forwardly of the table 10. Thus, the head 15 of a possible passenger is more smoothly dampened in case of a frontal collision of the aircraft. It can also be contemplated to combine such an increasing resistance means behind a blocking part 14, as defined in the embodiment of FIGS. 4A and 4B. In this case, this means 20 only plays its role when the blocking part 14 has been ruptured.

It is specified that the centre part 18 of the seat back 3 can be made of one of several parallel fabrics, possibly spaced apart from each other, thus making up a seat back 3 having a rather large thickness.

Figure 8A:
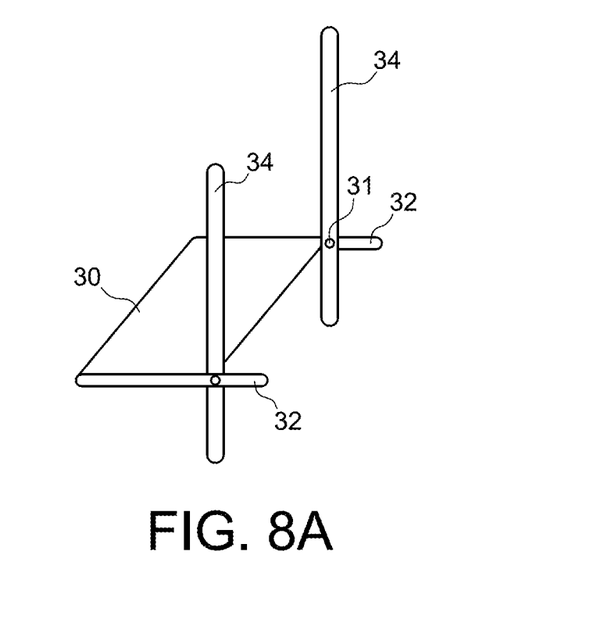
FIGS. 8A and 8B show a fold-down element of a seat according to the prior art.
Figure 8B:
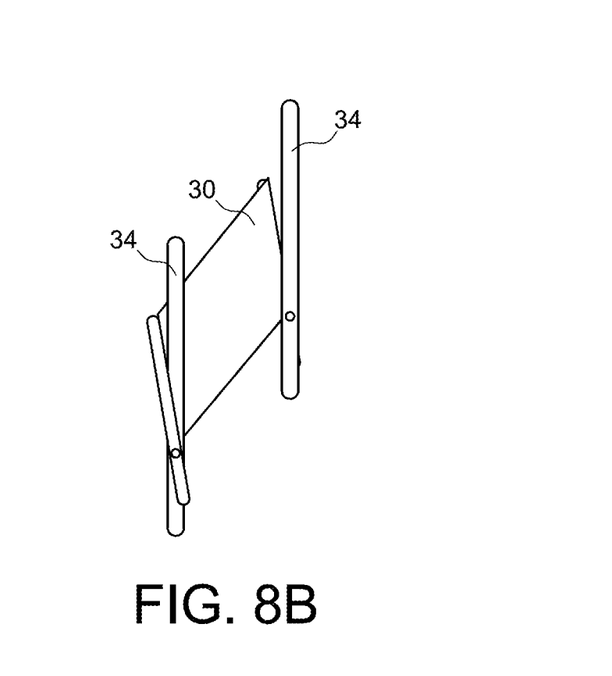

FIGS. 8A and 8B show an exemplary embodiment of a table 30 of prior art. The latter is pivotably mounted about a horizontal axis of rotation 31, with respect to a substantially vertical structure element 34. In this case, the attachment lugs 32 of the table 30 are placed outside the vertical structure elements 34.

As shown in FIG. 8B, when the table 30 rocks upwards, towards the vertical structure elements 34, it is blocked in a nearly vertical position, because it abuts against the nearly vertical structure elements 34, because its length is higher than the interval separating both substantially vertical structure elements 34.

Figure 9A:
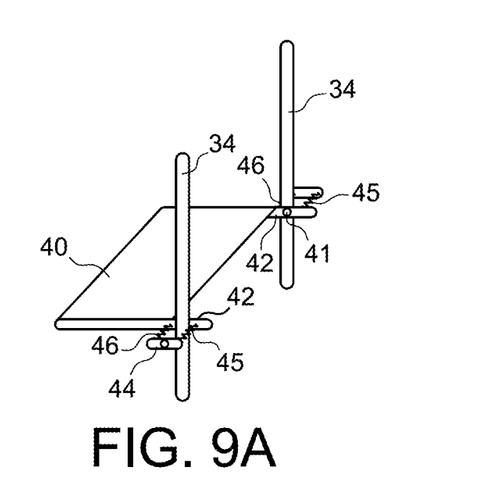
FIGS. 9a, 9B, and 9C show a fourth embodiment of the abutment means used in a seat according to the invention.
Figure 9B:
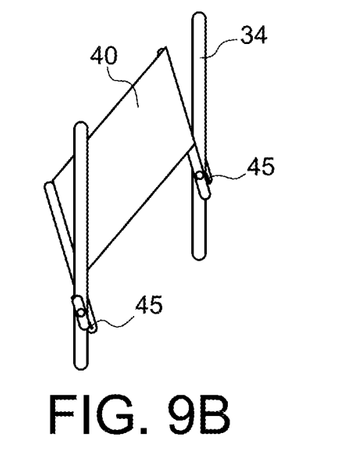
Figure 9C:
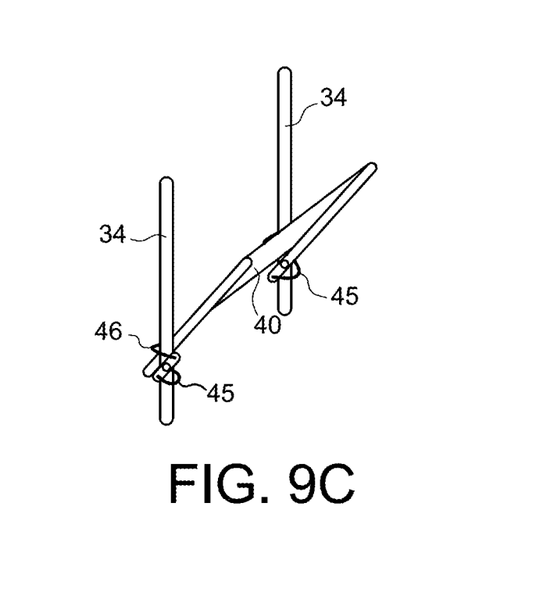

With reference to FIGS. 9A, 9B and 9C, a second elastic embodiment of the increasing resistance means uses part of the structure 1, namely the nearly vertical structure elements 34. In this case, the attachment lugs 42 of the table 40 are positioned inside both vertical structure elements 34, such that the table 40, which is also less long than the interval of both vertical structure elements 34, can rock on the other side thereof, towards the centre part of the seat back.

FIG. 9B shows the beginning of the rocking, whereas FIG. 9C shows the end of the rocking, the table 40 having moved to the other side of the nearly vertical structure elements 34.

In this embodiment, the two axes of rotation 41 are integral with the attachment lugs 42 of the table 40 and project on the other side of each of both vertical structure elements 34. Moreover, each outer end of the two axes of rotation 41 is provided with an attachment element 44, projecting from either side of the corresponding structure element 34 and being substantially parallel to the table 40. Moreover, first elastic elements 45 connect both ends of each of these two attachment elements 44 with the element of the corresponding attachment lug 42. Further, second elastic attachment elements 46 connect the other end of these attachment elements 44 with the part of the attachment lug 42 located near the table 40. Consequently, as shown in FIG. 9B, when the table 40 rocks upwards, in a nearly vertical position, the elastic elements 45 and 46 abut against the corresponding structure element 34. If a force is applied to the table 40, the latter will go on rocking, as shown in FIG. 6C, on the side of the seat back. The first and second elastic elements 45 and 46 are then biased in expansion, since they are elongated about the corresponding structure element 34. Therefore, they exert an increasing spring force with the table 40 rocking towards the seat back. In this case, a gradual slowing down of the rocking of the passenger's head which has abutted against the table 40 is also achieved.

The table of the seat according to the invention is particularly interesting when it is linked to a seat the seat back structure of which is rigid, in that this seat back structure is not deformed in the case of a violent frontal crash, such as the crash 16g defined by the European Technical Standard Order (ETSO) C127a of the European Aeronautics Security Agency (EASA). A tubular skeleton, such as the one represented in FIG. 1, can be an example of the structure 1 of such a seat.

What is claimed is:

1. A vehicle seat for a passenger, including a seat back having a front face adapted to point to the passenger and a rear face opposite to the front face, the seat back including a fold-down element to the rear face of the seat back, pivotably mounted with respect to the seat back, by means of at least one hinge about an axis of rotation enabling the fold-down element to take on at least two predetermined angular positions, defined by at least two abutment means, including a substantially vertical position, in which the fold-down element is folded up to the rear face of the seat back, the abutment means, relating to the substantially vertical position, being placed at the hinge,
   wherein the abutment means, relating to the substantially vertical position, includes increasing resistance means, able to hold the fold-down element in the substantially vertical position, in the absence of a collision, and able to allow the fold-down element pivoting to be continued, with an increasing pivoting resistance, to the front face of the seat back, under an effect of said collision against the fold-down element beyond a force with a predetermined value.

2. The seat according to claim 1, wherein the increasing resistance means includes at one elastic spring.

3. The seat according to claim 1, wherein the increasing resistance means include a series of blocking parts, each able to break off mechanically due to a predetermined force, increasing in the breaking direction.

4. The seat according to claim 1, wherein the fold-down element is mounted between two structure elements of the seat, pivotably about an axis of rotation of said at least one hinge, which includes for each structure element, a rotary part projecting from each structure element, and in that the increasing resistance means include first and second elastic elements each attached by a first end to the rotary parts, and by a second end to attachment parts for attaching the fold-down element at said at least one hinge, the first and second elastic elements being located on either side of the structure elements.

5. The seat according to claim 1, wherein the increasing resistance means include at least one element chosen from: a jack system, a solid or hydraulic friction brake system, a system of nested toothed pulleys.

6. The seat according to claim 1, wherein a predetermined value of the collision force is higher than or equal to 300 Newtons.

7. The seat according to claim 1, characterised in that the abutment means, relating to the substantially vertical position, includes a blocking part able to hold the fold-down element in the substantially vertical position in the absence of said collision, and able to mechanically break off under the application of the force of said collision with a predetermined value.

8. The seat according to claim 1, characterised in that said at least one hinge includes a bush in which a circular groove forming an arc of circle is provided, wherein a pin integral with a pivoting end of the fold-down element is slidable, one end of the circular groove making up a second abutment means of the at least two abutment means, said second abutment means defining a substantially horizontal position of the fold-down element.

* * * * *